United States Patent

[11] 3,593,945

[72] Inventors Harvey J. Richardson
Ventura;
Dean L. De Moss, Camarillo, both of, Calif.

[21] Appl. No. 725,808
[22] Filed May 1, 1968
[45] Patented July 20, 1971
[73] Assignee Minnesota Mining and Manufacturing Company
St. Paul, Minn.

[54] CAPSTAN ASSEMBLY

8 Claims, 7 Drawing Figs.

[52] U.S. Cl. .......... 242/192
[51] Int. Cl. .......... G03b 1/04, G11b 15/32
[50] Field of Search .......... 242/55.11—55.14, 192, 198, 189; 179/100.2; 274/4, 11; 178/6.6

[56] References Cited

UNITED STATES PATENTS

| | | | |
|---|---|---|---|
| 2,733,069 | 1/1956 | Frost et al. | 274/4 |
| 3,291,409 | 12/1966 | McClellan | 242/198 |
| 3,345,457 | 10/1967 | MacLeod | 178/6.6 |
| 3,390,841 | 7/1968 | Maxey | 242/189 |
| 3,460,781 | 8/1969 | Uber | 242/192 |

FOREIGN PATENTS

| | | | |
|---|---|---|---|
| 270,050 | 5/1927 | Great Britain | 242/55.14 |
| 702,345 | 1/1941 | Germany | 242/55.14 |

*Primary Examiner*—Leonard D. Christian
*Attorney*—Smyth, Roston and Pavitt

ABSTRACT: The present invention relates to a tape transport mechanism including a rotatable capstan having at least an outer layer of an elastomeric material and with magnetic tape formed in first and second rolls and with a tape path between the first and second rolls. A tape guiding member is positioned adjacent to the rotatable capstan and the tape path between the first and second rolls passes over a first circumferential portion of the capstan, over the tape guiding member and then back to and over a second circumferential portion of the capstan. The magnetic tape is driven between the first and second rolls by directly maintaining the rolls in engagement with the outer layer of the capstan. The invention also includes providing a rotatable helical magnetic transducing head as the tape guiding member so as to provide for a helical recording of information on the magnetic tape as it is driven between the first and second rolls. In addition, the invention includes maintaining one of the rolls of magnetic tape in engagement with the capstan with a greater force than is used to maintain the other of the rolls so as to provide for a tension in the tape path. The present invention may also be incorporated in a tape cartridge by including at least the first and second rolls in a common outer housing.

INVENTORS:
Harvey J. Richardson
Dean L. DeMoss
By Smyth, Roston & Pavitt
ATTORNEYS INVENTORS:
Harvey J. Richardson
Dean L. DeMoss
By Smyth, Roston & Pavitt
ATTORNEYS INVENTOR:
Harvey J. Richardson
Dean L. DeMoss
By Smyth, Roston & Pavitt
ATTORNEYS INVENTORS:
Harvey J. Richardson
Dean L. DeMoss
By Smyth, Roston & Pavitt
ATTORNEYS

CAPSTAN ASSEMBLY

Magnetic recording is becoming increasingly important as a primary method by which to store and retrieve information. Magnetic recording is used the storage of audio, video and instrumentation information. For the recording of information at higher frequencies, it becomes necessary to provide for a greater relative tape-to-head speed. For example, broadcast video recorders are high-speed rotating magnet heads which provide for a recording path transversely across the tape as the tape is moved longitudinally. The relative speed between the tape and the rotating heads is quite high so that relatively high frequency information may be recorded. This type of system using rotating magnetic heads is difficult to construct and is relatively expensive in cost and maintenance.

Other systems provide for a high tape-to-head speed by passing the tape around a rotating helical magnetic transducing head in a manner so as to provide for a helical track on the magnetic tape. Of course, the simplest method of increasing the tape-to-head speed is merely to move the tape at a relatively high speed across the face of the head. In all of these systems described above for high frequency recording, and, indeed, even with magnetic tape recording and reproducing systems for storing audio information, it is important to maintain a stable movement of the tape from a payout to a takeup reel.

This invention is concerned with a tape transport mechanism for providing a transfer of magnetic tape from a first roll of magnetic tape to a second roll of magnetic tape in a manner which is simpler than the prior art systems and provides for a very stable transfer of the magnetic tape. In addition, the tape transport mechanism of the present invention is constructed so that all of the normal methods of having the transducing head contact the magnetic tape may still be used.

Generally, the invention provides for the magnetic tape being formed into two rolls of magnetic tape tightly wound over rotatable members and wherein the hub members generally do not include flange members for supporting the tape. The magnetic tape is self supporting because most of the air is squeezed out when the tape is tightly wound. The magnetic tape is driven from the first roll to the second roll using a capstan having at least an outer portion of elastomeric material. Specifically, the capstan may have at least an outer portion of a rubberlike material which is substantially noncompressible but which has an elastic flow, or the capstan may be composed of the rubberlike material.

The rolls of magnetic tape are pressed directly against the capstan so as to produce a driving of the tape from one roll to the other. The rolls may be forced against the capstan with different forces to that the takeup roll is forced against the capstan with a greater force the payout roll. This differential forcing of the rolls creates a tension in the tape since the tape going onto the takeup roll is moving at a slightly greater speed than the tape coming off the payout roll.

The difference in speeds which results in the tension in the tape is produced due to the elastic flow of the substantially noncompressible rubberlike material. This elastic flow may be analogized to the flow of a liquid through a restricted area which results in an acceleration of the liquid through the restricted area. Essentially, the outer surface of the capstan is accelerated due to the restricted area adjacent to the takeup roll as compared with the flow of the capstan material adjacent to the payout roll. This phenomenon may be more clearly understood with reference to U.S. Pat. No. 3,093,284 issued June 11, 1963, in the name of John T. Mullin and assigned to the same assignee as the instant case.

In the Mullin patent the tape is maintained on normal payout and takeup reels and is pinched against the capstan using nip rollers each having a relatively hard surface. The present invention directly uses the rolls of magnetic tape as part of the driving system so as to minimize the tape path between the rolls of magnetic tape. This use of the rolls of magnetic tape as part of the driving system provides for a greater control of the tape path and allows for a simpler arrangement and a more accurate control of the tape as it is driven from one roll to the other.

In addition to the above, the tape path between the rolls of magnetic tape of the present invention includes an area where the tape is taken off of the capstan and around a tape guiding member. The use of the tape guiding member provides for a greater flexibility in the placement of the transducing means such as the magnetic head for recording and reproducing information on the magnetic tape. Specifically, the transducing heads may be provided in the freely suspended portion of the tape between the capstan and the tape guiding member. In addition, the tape guiding member itself may constitute a magnetic transducing head, for example, a rotating helical magnetic transducing head.

Other aspects of the resent invention are the use of the rolls of magnetic tape in a common housing so as to provide for a tape cartridge. Other portions of the tape transport mechanism of the present invention such as the capstan and the tape guiding member may also be included within the common housing so as to form the tape cartridge.

In addition to the above, the tape transport mechanism of the present invention also includes varying the force applied to at least one of the rolls of magnetic tape so as to provide for a constant tension in the tape path as the size of the rolls changes. It is to be appreciated that as tape is transferred from one roll to the other, the size of the roll varies, which change in size varies the area of contact between the roll and the capstan. The change in area of contact would tend to vary the elastic flow of the elastomeric capstan material and the force by which at least one of the rolls of magnetic tape engages the capstan may be varied so that the tension in the tape path may be maintained constant.

The present invention, therefore, provides for an efficient tape transport mechanism which is simpler than prior art systems and which provides for a very accurate control of the tape passing between the pair of rolls of magnetic tape. Because of this accurate control, the tape may be moved at relatively great speeds without sacrificing accuracy of the movement of the tape. Also, the removal of a portion of the tape from the capstan allows for more efficient and traditional methods of insuring accurate and constant contact between the transducing heads and the magnetic tape. This control of the contact between head and tape is important, especially at higher frequencies, since a variation in the contact between the transducing head and the tape may provide for great variations in the amplitude of the information recorded or reproduced from the magnetic tape. A clearer understanding of the invention will be had with reference to the following description and drawings wherein:

Figure 1:
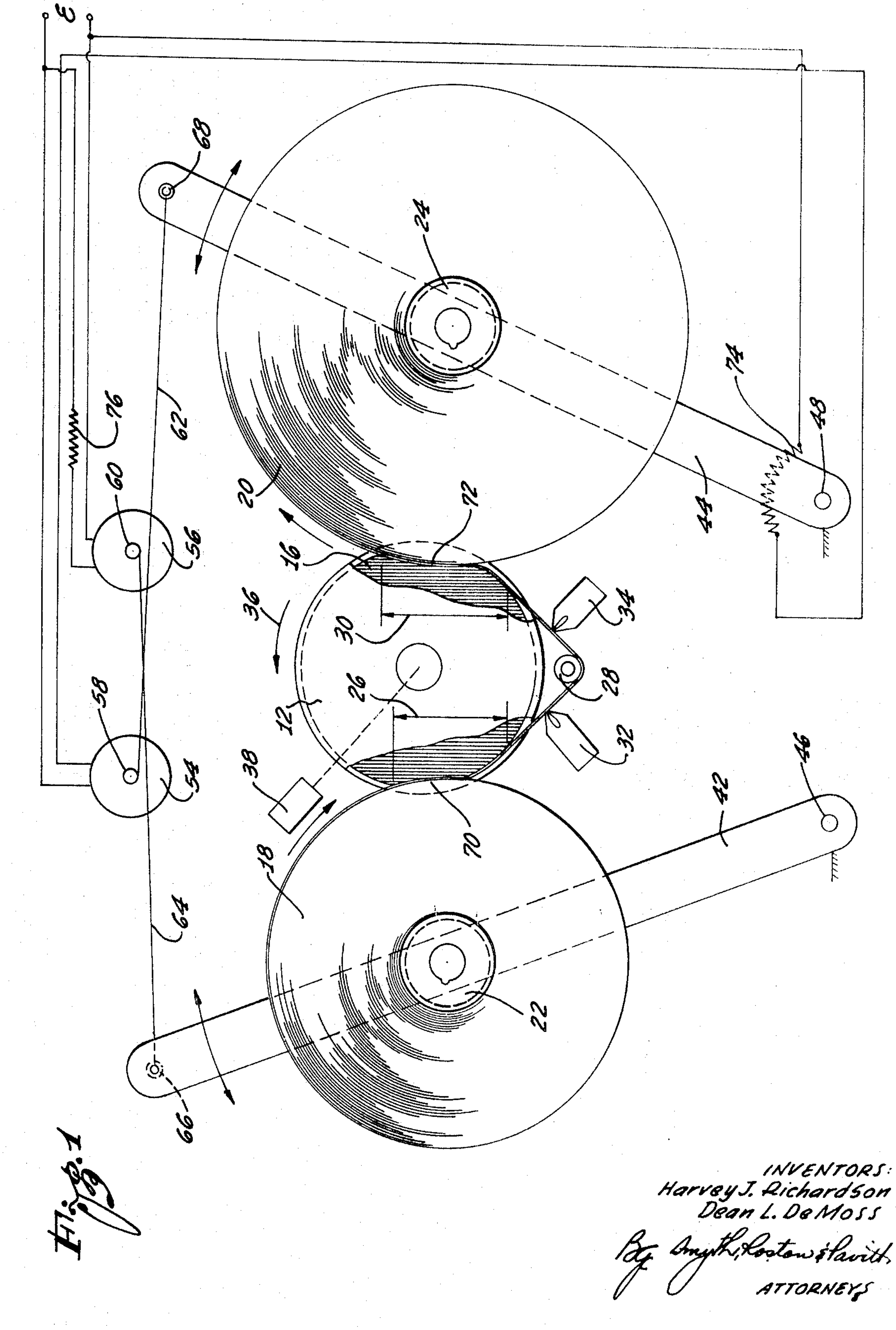
FIG. 1 illustrates a first embodiment of the invention for recording information longitudinally on the tape.
Figures 2, 5, 7:
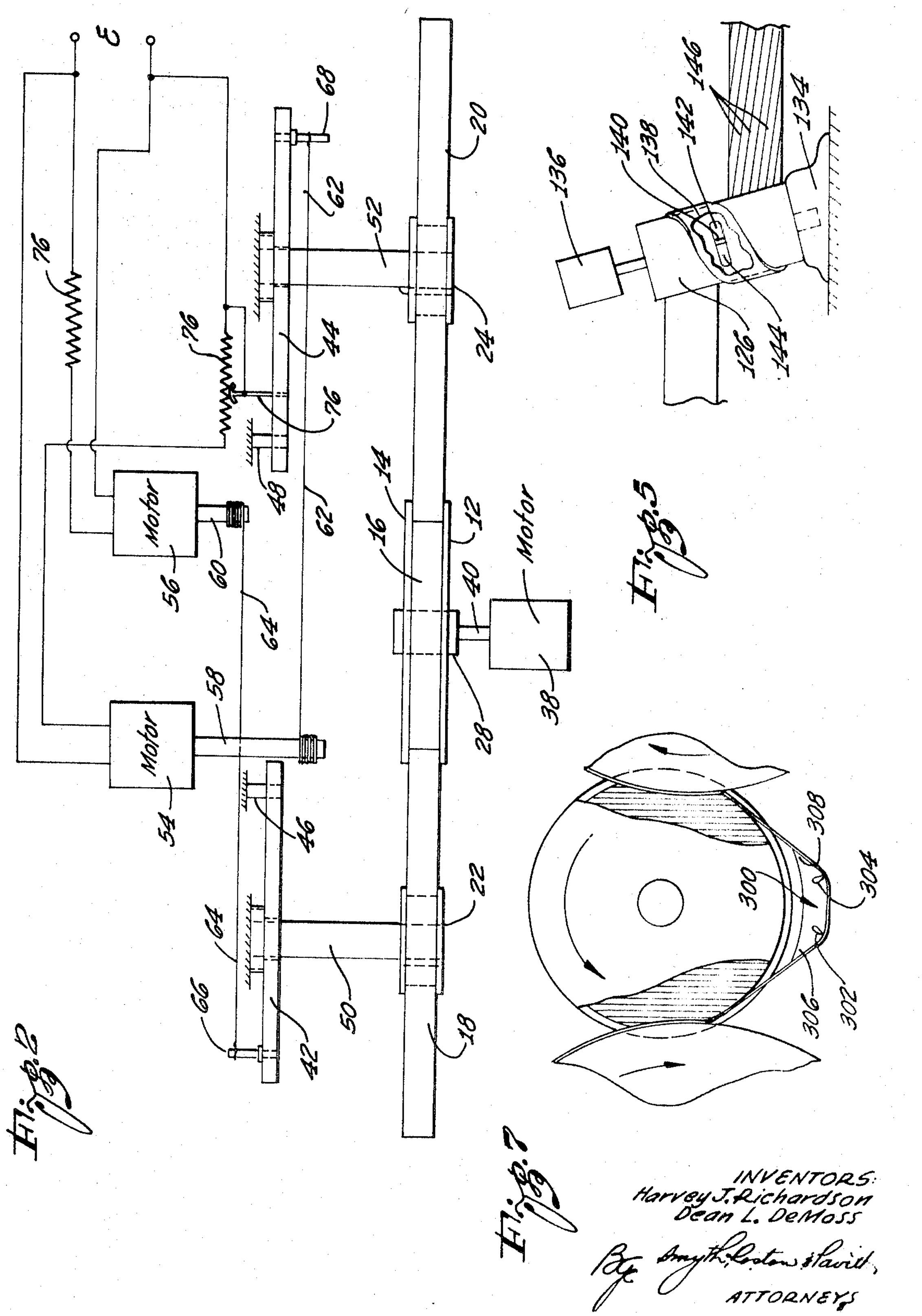
FIG. 2 illustrates a top view of the embodiment of FIG. 1.
FIG. 5 is an enlarged fragmentary view of the helical magnetic transducing head of FIGS. 3 and 4.
FIG. 7 illustrates a further embodiment of the invention for recording information longitudinally on the tape and using the transducing head as a tape guide member.

In FIG. 1, the first embodiment of the invention is shown illustrating the longitudinal recording of information. FIG. 2 is a top view of the embodiment of FIG. 1. In FIGS. 1 and 2, a driving member 10 includes a pair of flanges 12 and 14 supporting a rubberlike capstan member 16. The rubberlike capstan member 16 is substantially noncompressible and has a relatively high elastic flow so that the material of the capstan member may be analogized to a liquid.

Magnetic tape is formed into a pair of magnetic tape rolls 18 and 20, which rolls are tightly wound on hub members 22 and 24. Due to the nature of the drive system, the tape rolls 18 and 20 are essentially devoid of air between adjacent layers of the tape, The tape forms a path between the tape rolls 18 and 20, which path passes over a first circumferential portion of the capstan 16, such as shown by portion 26. The tape then leaves the capstan 16 and passes over a tape guiding member 28 and back over a second circumferential portion of the capstan 16 as shown by portion 30.

Intermediate the capstan 16 and the tape guiding member 28, the magnetic tape is freely supported and, as an example, magnetic transducing heads 32 and 34 may be mounted in contact with the tape in a normal manner so as to provide for the recording and reproducing of information on the magnetic tape. It is to be appreciated that any type of magnetic transducing head may be used including a rotating magnetic transducing head. The capstan 16 may be driven in a direction shown by the arrow 36 by a motor 38 which is coupled to the capstan through a shaft 40. It is to be appreciated that the motor 38 is shown directly coupled to the capstan but that other means such as a belt drive or gearing arrangement may be used.

The rolls of magnetic tape 18 and 20 are supported on arms 42 and 44, which arms are rotatably pivotable around pivot points 46 and 48. The hub members 22 and 24 are rotatably supported on shaft members 50 and 52, which shaft members are connected to the arms 42 and 44. It can be seen, therefore, that the arms 42 and 44 rotatably support the rolls of magnetic tape 18 and 20 so that the rolls of magnetic tape may be moved into direct engagement with the capstan 16.

In order to provide for a proper engagement of the rolls of magnetic tape 18 and 20 with the capstan 16, a pair of stalled motors 54 and 56 are used. The motors 54 and 56 include shafts 58 and 60, and the shafts 58 and 60 are interconnected with the arms 42 and 44 using cables 62 and 64. Specifically, the cables 62 and 64 are attached to the arms 42 and 44 by connecting the cables to members 66 and 68. It can be seen, therefore, that as the motors 54 and 56 are operated, they produce a force on the arms 42 and 44 to bring the rolls of magnetic tape 18 and 20 in engagement with the capstan 16.

The motors 54 and 56 may be operated in a stalled condition and in such a stalled condition the force produced by the motor is constant assuming the voltage applied to the motor is constant. Actually, the force varies in proportion to the voltage applied to the motors 54 and 56 so that a variation of the voltage applied to the motors produces a variation in the force pulling on the rms 42 and 44. As a specific example, the motors 54 and 56 may be AC torque motors which are known to have a constant torque when the motor is stalled, which torque is dependent upon the applied voltage.

In the operation of the system of FIGS. 1 and 2, the capstan 16 is driven in a direction shown by the arrow 36 and the motors 54 and 56 have an applied voltage so as to force the rolls of magnetic tape 18 and 20 into engagement with the capstan 16. The engagement of the capstan 16 with the roll of magnetic tape 18 produces a deformation in the capstan 16 as shown at position 70. Since the capstan 16 is composed of an elastomeric material, this essentially restricts the flow of the material at this position 70. Therefore, the tape leaving the roll of magnetic tape 18 has moved at a first particular speed in accordance with the deformation of the capstan 16 at position 70. The tape then passes around tape guiding member 28 and back to the capstan 16.

As shown in FIG. 1, the capstan 16 is deformed at the position 72 and if the force by which the roll of magnetic tape 20 is pulled against the capstan 16 is larger than the force by which the roll of magnetic tape 18 is pulled, the deformation at the position 72 is greater than the deformation at the position 70. If the deformation at position 72 is greater, the flow of the material 16 adjacent the position 72 is greater than the flow of the material 16 adjacent the position 70 so that the tape at the position 72 is accelerated relative to the tape at the position 70. Therefore, a tension is produced in the tape loop between the rolls of magnetic tape which pass over the tape guiding member 28. As long as the force urging the roll of magnetic tape 20 into engagement with the capstan 16 is greater than the force which urges the roll of magnetic tape 18 into engagement with the capstan 16, the tension in the tape is produced.

It is to be appreciated that with the passage of tape from the roll 18 to the roll 20, the size of the roll of magnetic tape 20 increases and the size of the roll of magnetic tape 18 decreases and, in addition, the relative areas of deformation at the positions 70 and 72 changes. Therefore, the embodiment of FIGS. 1 and 2 also provides for a means of maintaining a relatively constant tension in the tape path passing over the tape guiding member 28. This means of providing a constant tension in the tape path uses a variable resistor 74 which is varied in accordance with the position of an arm 76 (shown in FIG. 2), which arm varies in accordance with the position of the supporting arm 44. The resistor 74 is in the path between a source of voltage E and the motor 54. Therefore, as the position of the supporting arm 44 varies in accordance with the size of the roll of magnetic tape 20, the value of the resistor 74 changes thereby varying the voltage applied to the motor 54.

The voltage applied to the motor 56 is also derived from the source of voltage E but through a constant resistor 76. The voltage supply to the motor 56 may therefore be adjusted in accordance with the value of the resistor 76 to always be less than the voltage applied to the motor 54, but the value of the voltage applied to the motor 54 may be constantly adjusted in accordance with the value of the resistor 74 so that a constant tension is produced in the tape path passing between the rolls of magnetic tape 18 and 20. It is to be appreciated that the value of the voltage applied to both of the motors may be varied at the same time using a second variable resistor. Also, if it is desired to run the tape from the roll 20 to the roll 18, the resistors 74 and 76 may be switched so that the voltage applied to the motor 56 is always greater.

It is clear, therefore, from the embodiment of the invention shown in FIGS. 1 and 2, that a very tightly coupled tape path is provided between rolls of magnetic tape 18 and 20. Due to the action of the elastomeric capstan 16, essentially all of the air is squeezed out between the layers in the rolls 18 and 20 so that they form very hard noncompressible rolls. These rolls operate in combination with the capstan 16 in providing for a flow of the tape between the rolls 18 and 20. In addition, the tape path between the rolls 18 and 20 includes a tape guiding member 28 which allows the tape to be lifted off of the capstan material 16. The tape in the area between the capstan 16 and the tape guiding member 28 therefore is freely supported and conventional magnetic transducing heads may be used for record and playback.

The system of the present invention wherein the tape path between the rolls of magnetic tape includes an area where the tape is lifted off of the capstan also provides for other possibilities. For example, in the embodiment shown in FIGS. 3, 4 and 5, the magnetic tape may pass over a tape guiding member, which tape guiding member actually forms a magnetic transducing head. Specifically in the embodiment of FIGS. 3, 4 and 5, the tape guiding member forms a rotatable helical magnetic transducing head for recording and playing back information on the tape. The helical magnetic transducing head forms a plurality of recording paths across the tape at an angular relationship with the tape.

Figures 3, 4:
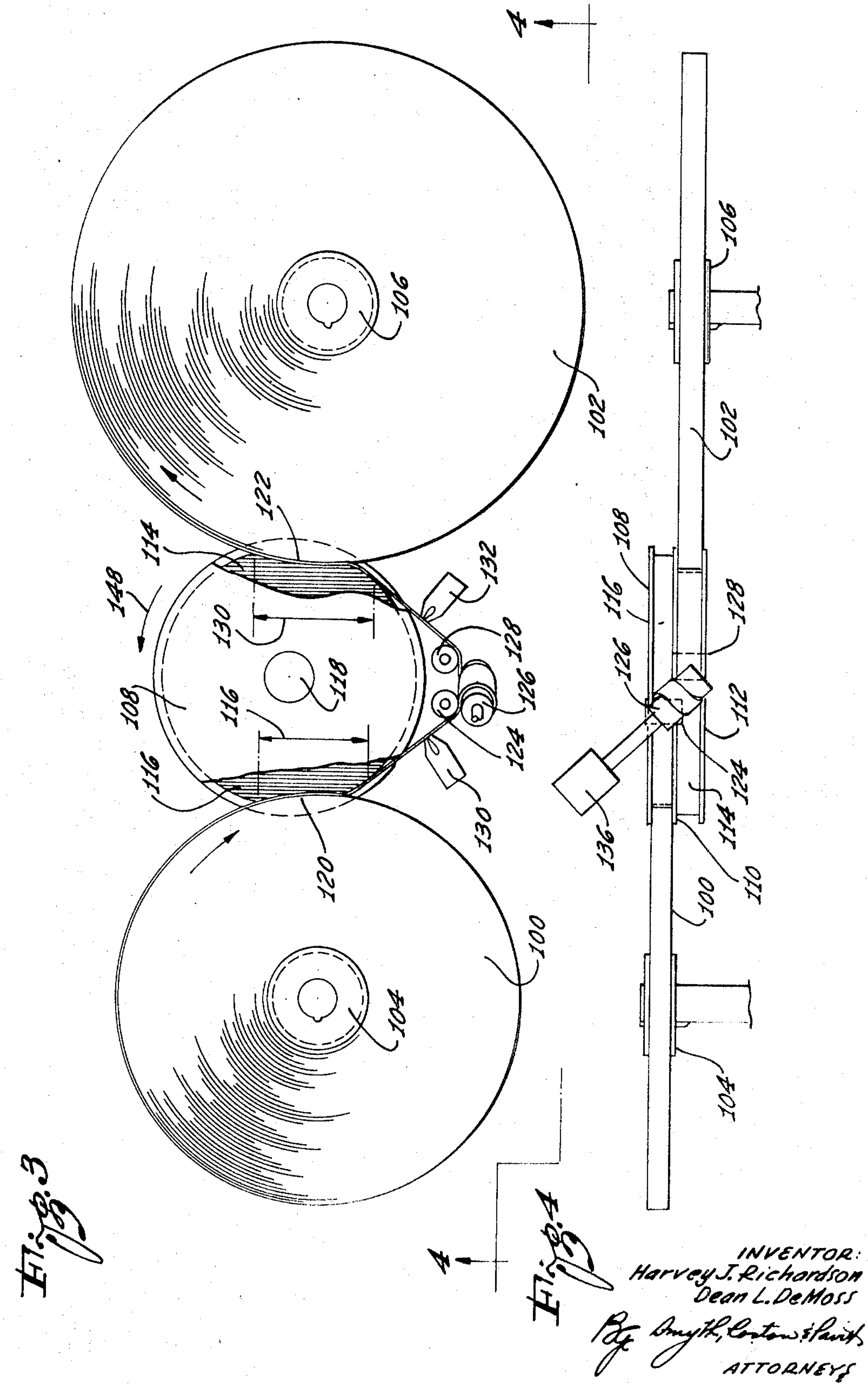
FIG. 3 illustrates a second embodiment of the invention illustrating the helical recording of information on the magnetic tape.
FIG. 4 is a bottom view of the system of FIG. 3.

Referring now to FIGS. 3, 4 and 5, magnetic tape is formed into a pair of rolls of magnetic tape 100 and 102. The tape is wound on hub members 104 and 106. A driving member includes three flange members 108, 110 and 112, which flange members support a pair of rubberlike capstan members 114 and 116. The driving member rotates around a point 118 and is driven by a motor (not shown) in a similar manner to the driving member in FIGS. 1 and 2.

As can be seen in FIG. 4, the driving member essentially includes the pair of capstan members 114 and 116 which are stacked so that the roll of magnetic tape 100 contacts the upper capstan member 116 whereas the roll of magnetic tape 102 contacts the lower capstan member 114. The hub members 104 and 106 may be mounted on arms in the same manner as the embodiment of FIGS. 1 and 2 and the arms may be provided with a force to have the rolls of magnetic tape engage the capstan members 114 and 116 in the same manner as shown in FIGS. 1 and 2. The roll of tape 100 engages the capstan member 116 to produce deformation in the area 120 and the roll of magnetic tape 102 engages the capstan member 114 to produce deformation in the area 122. The capstan 114 may be provided with a greater deformation in the area 122 than the deformation in the area 120 of the capstan 116 so that the tape speeds up due to the restriction of the flow of the capstan member 114 in the area 122. This differential deformation provides for a tension in the tape.

As the tape leaves the roll of magnetic tape 100 it passes over a first circumferential portion 123 of the capstan member 116. The tape then leaves the capstan 116 and passes over a post 124. The tape is then directed over a rotatable helical transducing head 126 and back over a second post 128. The tape then passes over a second circumferential portion of the capstan member 114, which portion is designated as 130, before the tape is wound onto the roll of magnetic tape 102. It is to be appreciated that the posts 124 and 128 are used so that the tape entering the helical head 126 is parallel to the tape leaving the helical head 126, which parallel relationship assures that the wrap around the helical head 126 is 360°. It is also to be appreciated that the posts 124 and 128 may be removed and the tape directly wrapped around the helical head 126. This, however, would not produce a 360° wrap of the tape and it may become necessary to use more than one recording gap in the head if the posts 124 and 128 are not used. In addition to the above, a pair of magnetic transducing heads 130 and 132 are shown positioned in a freely supported portion of the tape. These transducing heads may be used to produce a control track and an audio track on the magnetic tape.

An enlarged fragmentary portion of the helical transducing head 126 in combination with the magnetic tape is shown in FIG. 5. As can be seen in FIG. 5, the helical transducing head 126 is supported by a member 134 so that the head 126 is offset from the horizontal axis. The helical transducing head 126 may be rotated by a motor 136 as shown in FIG. 4. Returning to FIG. 5, the magnetic tape is cut away at portion 138 so as to show the construction of the transducing head 126. Specifically, the head 126 incorporates in its surface a magnetic transducing head which includes an air gap 140. Magnetic material 142 and 144 forms pole pieces so as to produce magnetic flux through the air gap 140. As the head 126 rotates and as the tape is moved over the head, a plurality of tracks are produced as shown by tracks 146, which tracks 146 are angularly arranged across the magnetic tape. The use of the rotating helical transducing head, therefore, provides for a simple way in which to increase the relative speed between the head and the tape. The specific design of the helical head 126 is well known and forms no part of the present invention.

Returning to FIG. 3, it can be seen that as the capstan is rotated, for example in a direction shown by an arrow 148, the tape on the roll of magnetic tape 100 leaves the roll of magnetic tape 100 and passes over a circumferential portion of the capstan member 116. Because of the deformation of the capstan member 116, the material 116 is sped up at the interface 120 between the roll of magnetic tape 100 and the capstan member 116. The tape then passes over post 124 and is wrapped 360° around the helical head 126. The tape then passes over the post 128 and back to the roll of magnetic tape 102.

As indicated above with reference to the embodiment of FIGS. 1 and 2, the roll of magnetic tape 102 may be forced against the capstan member 114 with a greater force than that used in forcing the roll of magnetic tape 100 against the capstan member 116. This produces a greater deformation and speed for the tape entering the roll of magnetic tape 102 thereby producing tension in the tape path between the rolls of magnetic tape 100 and 102. As can be seen in FIG. 4, the tape in passing over the helical transducing head 126 exits the helical head 126 at a position below the entrance of the magnetic tape onto the helical head 126. Therefore, the rolls of magnetic tape 100 and 102 are in parallel planes offset from each other.

The use of a tape transport mechanism constructed in accordance with the teachings of the resent invention wherein the tape is removed from the surface of the capstan allows for the tape to pass over a tape guiding member, which tape guiding member may form a helical transducing head. This construction allows for the advantages of the direct drive of the rolls of magnetic tape by the capstan including an outer layer of elastomeric material, but, in addition, allows for the use of recording techniques such as helical recording.

Figure 6:
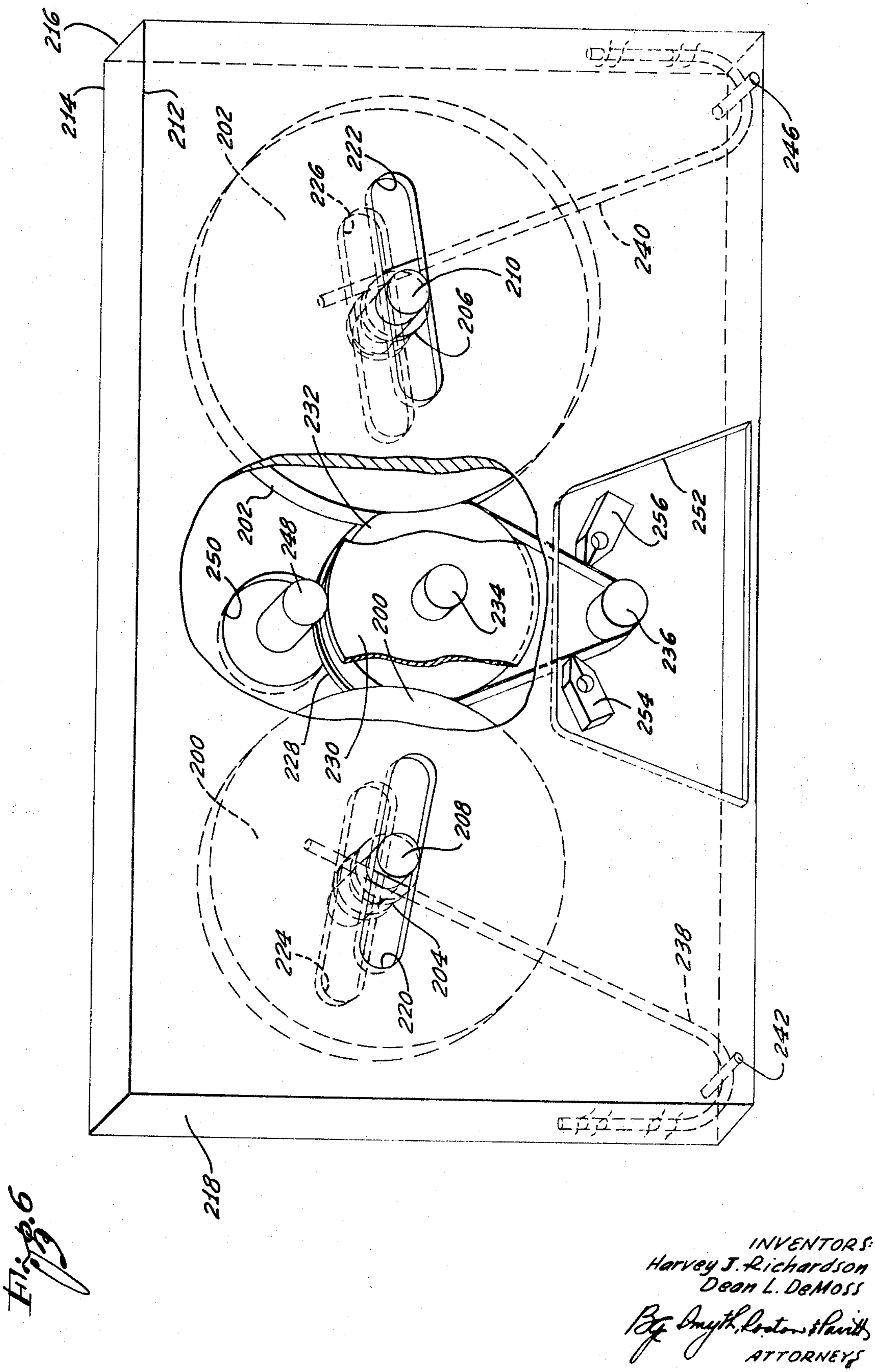
FIG. 6 illustrates a third embodiment of the invention incorporating the tape transport mechanism in a tape cartridge.

FIG. 6 illustrates a third embodiment of the invention wherein the rolls of magnetic material are included in a common housing to form a tape cartridge. In FIG. 6, a pair of rolls of magnetic material 200 and 202 are each supported on hub members 204 and 206. A pair of spindle members 208 and 210 extend through the hub members 204 and 206 and the rolls of magnetic tape 200 and 202 are, therefore, rotatable around the spindles 208 and 210.

An outer housing includes a pair of opposite walls 212 and 214 which walls are supported in parallel to each other by at least a pair of side members 216 and 218. Cutout slots 220 and 222 are provided in the wall 212 and cutout slots 224 and 226, which are directly opposite the slots 220 and 222, are provided in the wall 214. The spindle members 208 and 210 fit through the slots so that the rolls of magnetic tape 200 and 202 are rotatably supported by the walls of the slots engaging the spindles 208 and 210. It is to be appreciated that these slots do not have to be completely through the walls 212 and 214 and that the entire construction may be internally within recessed portions in the interior walls.

A driving member includes a pair of flanges 228 and 230, which flanges support a capstan member 232 composed of an elastomeric material such as a rubberlike material. The capstan rotates about a shaft 234 rotatably supported between the walls 212 and 214. The tape is driven between the rolls 200 and 202 in a similar manner as shown with the previously illustrated embodiments and the tape path between the rolls of magnetic tape 200 and 202 include a tape-guiding member 236. The rolls of magnetic tape 200 and 202 may be forced into engagement with the capstan member 232 using springs 238 and 240. These springs are positioned around posts 242 and 246 and may rest against end wall members 216 and 218. The springs 238 and 240 specifically urge the spindles 208 and 210 so that he rolls of magnetic tape 200 and 202 are constantly urged into engagement with the capstan member 232.

The various components described above may all be included in the tape cartridge, but it is to be appreciated that particular ones may be eliminated and provided in a tape cartridge machine. For example, the capstan may be provided in the tape cartridge machine as well as the tape-guiding member 238. The members which must be included in the cartridge are the rolls of magnetic tape 200 and 202. In order to provide for a recording and reproduction of the information on the rolls of magnetic tape 200 and 202, the tape cartridge machine in which the tape cartridge of FIG. 6 is inserted, would include a capstan driving member for example a member 248. The member 248 may be provided to be in engagement with the capstan through a cutout 250 in the bottom wall 214.

In addition, both the top and bottom walls 212 and 214 may be cut out at positions 252 so that external transducing heads 254 and 256 may be inserted to contact the tape in the freely supported portions between the capstan 232 and the tape-guiding member 236. It is to be appreciated that the heads 254 and 256 do not form part of the cartridge but are part of the playback unit. The cartridge of FIG. 6 may, therefore, be inserted into a playback unit which includes the driving means 248 and the heads 254 and 256 and in addition includes the various electronics in order to provide for a recording and reproduction of information on the rolls of magnet tape 200 and 202.

In the embodiment of FIG. 6, springs 238 and 240 are shown to provide generally similar forces for producing engagement of the rolls of magnetic tape 200 and 202 with the capstan member 232. It has been found that at relatively slow speeds, for example, speeds which would be used in audio recording and reproduction, the springs are sufficient without the use of a greater spring pressure for the takeup roll. Essentially the springs do provide for a tension in the tape since it is relatively easier to pull tape through the interface of the takeup roll and the capstan member 23 than it is to push the tape through the interface of the payout roll and the tape member 232. Therefore, the tape entering the takeup roll is at a slightly greater speed when compared with the tape leaving the payout roll, and this difference of speed produces a tension in the tape which is sufficient for relatively low speed recording and reproduction.

At higher speeds, the springs tend to bounce and the spring effect is lost so that it is generally necessary to provide for a differential pressure arrangement which may be of the type shown in the embodiment of FIG. 1. However, it is to be appreciated that various spring arrangements could be incorporated in the cartridge so as to provide for a differential pressure so as to produce a tension in the tape. For example, a third spring member may be incorporated in the cartridge, which spring member may be coupled to one side or the other so as to either increase the pressure on one side or reduce the pressure on the other side so as to provide for a differential pressure. Also, the cartridge may include extending arm members which would be similar to those shown in FIG. 1, and the playback unit could include stalled motor means coupled to these arms so as to provide for an accurate differential pressure of the rolls of magnetic tape against the capstan.

FIG. 7 illustrates a fourth embodiment of the invention wherein information is recorded longitudinally on the tape and wherein the magnetic transducing head forms the tape guiding member. The embodiment of FIG. 7 is essentially similar to that shown in FIG. 1, with the following exceptions. In FIG. 7 a magnetic transducing head 300 is positioned in the tape path and may include a head gap located at position 302 so as to record information and may include a head gap located at position 304 so as to reproduce information. It may be seen, therefore, that in the embodiment of FIG. 7 the magnetic transducing head, in addition to its reproduction function, also operates as a tape guiding member. The magnetic transducing head 300 may be shaped having tapering leading and trailing edges 306 and 308 so as to more efficiently guide the magnetic tape.

It is to be seen then that the present invention is directed to a tape transport mechanism which provides for a reliable and accurate control of tape passing from a first to a second roll of magnetic tape wherein the rolls of magnetic tape themselves serve as means in combination with an elastomeric capstan to provide for the driving of the tape from the first roll of magnetic tape to the second roll of magnetic tape. The tape path between the rolls of magnet tape includes a portion where the tape is removed from the capstan so that the transducing heads may be incorporated in the freely supported portion of the tape path removed from the capstan. The removal of the tape from the capstan provides for a great variety in the mounting and spacing of the recording heads and also allows for a recording head such as a rotatable helical magnetic transducing head to be included in the system.

It is to be appreciated that although the invention has been shown with reference to particular embodiments, various adaptations and modifications may be made and the invention is only to be limited by the appended claims.

We claim:

1. A tape transport mechanism, including
a rotatable capstan including at least an outer portion of elastomeric material,
a tape guiding member positioned adjacent to the rotatable capstan,
magnetic tape formed in first and second rolls and including a tape path between the first and second rolls passing over a first circumferential portion of the capstan, over the tape guiding member and back to and over a second circumferential portion of the capstan, and
means coupled to the first and second rolls of magnetic tape for maintaining the rolls in direct engagement with the capstan and wherein tension is maintained in the tape path between the first and second rolls by maintaining one of the rolls in engagement with the capstan with a greater force than the force used to maintain the other of the rolls in engagement with the capstan and wherein the tension in the tape path is maintained at a predetermined and constant level by varying at least one of the forces used to maintain the rolls in engagement with the capstan.

2. A tape transport mechanism, including
magnetic tape formed in first and second rolls and including a tape path between the first and second rolls,
a rotatable capstan including at least an outer portion of elastomeric material,
a rotatable helical magnetic transducing head positioned adjacent to the rotatable capstan and with the tape path between the first and second rolls passing over a first circumferential portion of the capstan over the rotatable helical magnetic transducing head and back to and over a second circumferential portion of the capstan, and
means coupled to the first and second rolls of magnetic tape for maintaining the rolls of magnetic tape in direct engagement with the capstan.

3. The tape transport mechanism of claim 2 wherein the magnetic tape passes over substantially the entire circumference of the helical head.

4. The tape transport mechanism of claim 2 wherein the magnetic tape passes completely around the circumference of the helical head and forms a helical wrap of the surface of the helical head.

5. A tape transport mechanism, including
a first roll of magnetic tape having the magnetic tape tightly wound on a first rotatable hub member,
a second roll of magnetic tape having the magnetic tape tightly wound on a second rotatable hub member and with the magnetic tape on the first roll passing to the magnetic tape on the second roll in accordance with the rotation of the hub members,
a rotatable capstan including at least an outer portion of elastomeric material,
a rotating helical magnetic transducing head positioned adjacent to the rotatable capstan and with the magnetic tape passing from the first roll to the second roll forming a tape path passing over a first circumferential portion of the capstan, over the rotating helical magnetic transducing head and back to and over a second circumferential portion of the capstan, and
means coupled to the first and second rolls of magnetic tape for maintaining the rolls of magnetic tape in direct engagement with the capstan.

6. A tape transport mechanism, including
first and second rotatable hub members,
magnetic tape tightly wound on the first rotatable hub member and with the magnetic tape passing to and tightly wound on the second rotatable hub member,
a rotatable capstan including at least an outer portion of elastomeric material in engagement with the magnetic tape tightly wound on the first and second rotatable hub members and with the capstan supporting a portion of the tape passing between the rotatable hub,
a rotating helical magnetic transducing head positioned adjacent to the rotatable capstan and with the magnetic tape passing between the rotatable hub members forming a tape path passing over the rotating helical magnetic transducing head.

7. A tape transport mechanism for transporting magnetic tape, including first and second rotatable hub members for supporting magnetic tape and for transferring the magnetic tape between the first and second rotatable hub members, a rotatable capstan including at least an outer portion of elastomeric material, a helical magnetic transducing head positioned adjacent to the rotatable capstan and with the magnetic tape transferred between the first and the second hub members, forming a tape path passing over a first circumferential portion of the capstan around the helical magnetic transducing head and back to and over a second circumferential portion of the capstan, and means coupled to the first and second hub members for maintaining the magnetic tape supported by the hub members in direct engagement with the capstan.

8. A tape transport mechanism, including a rotatable capstan including at least an outer portion of elastomeric material, a rotatable helical magnetic transducing head positioned adjacent to the rotatable capstan, magnetic tape formed in first and second rolls and including a path between the first and second rolls passing over a first circumferential portion of the capstan, over the rotatable helical magnetic transducing head and back to and over a second circumferential portion of the capstan, and means coupled to the first and second rolls of magnetic tape for maintaining the rolls in direct engagement with the capstan.

UNITED STATES PATENT OFFICE

CERTIFICATE OF CORRECTION

Patent No. 3,593,945 Dated July 20, 1971

Inventor(s) Harvey J. Richardson and Dean L. DeMoss

It is certified that error appears in the above-identified patent and that said Letters Patent are hereby corrected as shown below:

Column 1, line 52, change "to" to -- so --; and line 53, after "force" insert -- than --.

Column 2, line 17, change "resent" to -- present --.

Column 3, line 62, change "has" to -- is --.

Column 6, line 9, change "resent" to -- present --; and line 51, change "he" to -- the --.

Column 10, line 8, after "a" (first occurrence), insert -- tape --.

Signed and sealed this 25th day of July 1972.

(SEAL)
Attest:

EDWARD M.FLETCHER,JR.
Attesting Officer

ROBERT GOTTSCHALK
Commissioner of Patents